US010164302B2

(12) United States Patent
Brouwer et al.

(10) Patent No.: US 10,164,302 B2
(45) Date of Patent: Dec. 25, 2018

(54) PROCESS FOR RECYCLING LI-ION BATTERIES

(71) Applicant: Umicore, Brussels (BE)

(72) Inventors: Sybolt Brouwer, Berchem (BE); Jeroen Heulens, Kerkom (BE); David Van Horebeek, Tielt-Winge (BE)

(73) Assignee: Umicore, Brussels (BE)

(*) Notice: Subject to any disclaimer, the term of this patent is extended or adjusted under 35 U.S.C. 154(b) by 0 days.

(21) Appl. No.: 15/106,845

(22) PCT Filed: Nov. 25, 2014

(86) PCT No.: PCT/EP2014/075500
§ 371 (c)(1),
(2) Date: Jun. 21, 2016

(87) PCT Pub. No.: WO2015/096945
PCT Pub. Date: Jul. 2, 2015

(65) Prior Publication Data
US 2017/0005374 A1 Jan. 5, 2017

(30) Foreign Application Priority Data
Dec. 23, 2013 (EP) .................... 13199465

(51) Int. Cl.
*C22B 7/00* (2006.01)
*C22B 7/04* (2006.01)
*C21B 15/00* (2006.01)
*C22B 15/00* (2006.01)
*C22B 21/00* (2006.01)
*C22B 21/04* (2006.01)
*C22B 26/12* (2006.01)
*H01M 10/54* (2006.01)
*H01M 10/0525* (2010.01)

(52) U.S. Cl.
CPC ............. *H01M 10/54* (2013.01); *C21B 15/00* (2013.01); *C22B 7/001* (2013.01); *C22B 7/003* (2013.01); *C22B 7/04* (2013.01); *C22B 15/0052* (2013.01); *C22B 15/0056* (2013.01); *C22B 21/0069* (2013.01); *C22B 21/04* (2013.01); *C22B 26/12* (2013.01); *H01M 10/0525* (2013.01); *Y02P 10/214* (2015.11); *Y02W 30/84* (2015.05)

(58) Field of Classification Search
CPC ........ H01M 10/54; C21B 15/00; C22B 7/003; C22B 7/04; C22B 15/002; C22B 15/0056; C22B 21/0069; C22B 21/04; C22B 26/12
See application file for complete search history.

(56) References Cited

U.S. PATENT DOCUMENTS

| 9,203,126 B2* | 12/2015 | Takahashi | C22B 7/001 |
| 2007/0292760 A1* | 12/2007 | Patoux | H01M 4/485 |
| | | | 429/223 |
| 2012/0240729 A1* | 9/2012 | Verscheure | C23B 5/04 |
| | | | 75/626 |

FOREIGN PATENT DOCUMENTS

| CN | 101258252 A | 9/2008 |
| CN | 103380218 A | 10/2013 |
| CN | 103459623 A | 12/2013 |
| EP | 1589121 | 10/2005 |
| WO | 2011035915 | 3/2011 |
| WO | 2011035916 | 3/2011 |

OTHER PUBLICATIONS

Georgi-Maschler, T, et al. "Development of a Recycling Process for Li-Ion Batteries." Journal of Power Sources, vol. 207, pp. 173-182., www.elsevier.com/locate/jpowsour. (Year: 2012).*
International Search Report for PCT/EP2014/075500, dated Feb. 17, 2015.

* cited by examiner

*Primary Examiner* — George Wyszomierski
*Assistant Examiner* — Tima M McGuthry-Banks
(74) *Attorney, Agent, or Firm* — NK Patent Law

(57) ABSTRACT

The present invention concerns a process for the recovery of metals and of heat from spent rechargeable batteries, in particular from spent Li-ion batteries containing relatively low amounts of cobalt. It has in particular been found that such cobalt-depleted Li-ion batteries can be processed on a copper smelter by: feeding a useful charge and slag formers to the smelter; adding heating and reducing agents; whereby at least part of the heating and/or reducing agents is replaced by Li-ion batteries containing one or more of metallic Fe, metallic Al, and carbon. Using spent LFP or LMO batteries as a feed on the Cu smelter, the production rate of Cu blister is increased, while the energy consumption from fossil sources is decreased.

4 Claims, No Drawings

PROCESS FOR RECYCLING LI-ION BATTERIES

This application is a National Stage application of International Application No. PCT/EP2014/075500, filed Nov. 25, 2014. This application also claims priority under 35 U.S.C. § 119 to European Application No. 13199465.9, filed Dec. 23, 2013.

The present invention concerns a process for the recovery of metals and of heat from spent rechargeable batteries, in particular from spent Li-ion batteries containing relatively low amounts of cobalt.

In Europe, the societal need for metals recycling is being translated into a number of so-called directives. Directive 2006/66/EC of the European Parliament and of the Council of 6 Sep. 2006 relates to batteries and accumulators, and to waste batteries and accumulators, and regulates their manufacture and disposal in the EU (European Union). It entered into force on 26 Sep. 2006.

Pursuant to this directive, EU Commission Regulation No. 493/2012 of 11 Jun. 2012 lays down detailed rules regarding the calculation of recycling efficiencies. This Regulation shall apply to the recycling processes carried out in respect of waste batteries and accumulators from 1 Jan. 2014. The recycling targets are 75% by average weight for nickel-cadmium batteries, 65% for lead acid batteries, and 50% for others.

Several families of battery recycling processes are known. Most of these include a mechanical pre-treatment, typically an initial shredding step, followed by physical separations. Fractions having distinct compositions are obtained: dedicated chemical processes are then applied to each fraction for the further separation and refining of the contents.

Such processes are known from e.g. "A laboratory-scale lithium-ion battery recycling process, M. Contestabile, S. Panero, B. Scrosati, Journal of Power Sources 92 (2001) 65-69" and "Innovative Recycling of Li-based Electric Vehicle Batteries, H. Wang, B. Friedrich, World of Metallurgy 66 (2013), 161-167.

Shredding and physical separations are all but straightforward when dealing with Li-ion batteries. The lithium in the battery will react violently with air moisture and ignite the electrolyte and separators. Moreover, recycled batteries are not necessarily fully discharged: shredding will provoke short-circuits with high currents and local heating as a result. This situation may also induce fires. Cryogenic, vacuum, or inert atmosphere techniques mitigate the risks, but complicate the pre-treatment considerably.

Smelting processes solve this problem by allowing a furnace to be directly fed with complete cells or even with complete cell assemblies or modules, as long as the mass and dimensions of the lumps permit reasonable handling. However, the lack of pre-treatment transfers the burden of the separation and refining to chemical processes entirely.

Such routes are known from e.g. EP1589121 and EP2480697. They aim at the recovery of the most valuable metals, notably nickel and cobalt. Strongly reducing conditions and high process temperatures are however necessary to achieve this goal.

In recent years, the demand for rechargeable batteries as mobile energy sources has constantly increased. Consequently, the market share of Li-ion has been growing steadily, and several specific Li-ion battery technologies have been developed to fulfill the diversifying technical needs. Initially, most Li-ion rechargeable batteries made use of cathode material based on LCO (Lithium-Cobalt-Oxide), containing respectable amounts of cobalt. Nowadays, other chemistries are commonplace, such as LFP (Lithium-Iron-Phosphate) and LMO (Lithium-Manganese-Oxide), which contain little or no cobalt. LFP and LMO batteries are in high demand for electric power tools and E-bikes, for example. Electrical vehicles often take advantage of NMC (Nickel-Manganese-Cobalt) batteries, wherein the amount of cobalt is limited. The reduction or elimination of cobalt entails technical advantages, reduces the costs, and minimizes materials costs fluctuations that are typical with higher cobalt cathode compositions.

Table 1 shows typical composition ranges of the different types of battery cells in common use. The LMO and LPF chemistries show low low-cobalt contents consistently.

TABLE 1

Typical composition of different types of batteries (wt. %)

| Chemistry | Li | Ni | Mn | Co | Fe | Cu | Al |
|---|---|---|---|---|---|---|---|
| LCO | 1-2 | 2-8 | 0-2 | 10-15 | 10-15 | 5-10 | 5-10 |
| LMO | 1-2 | 2-8 | 10-20 | 0-3 | 0-5 | 10-20 | 10-20 |
| NMC | 1-2 | 2-8 | 2-8 | 2-8 | 0-10 | 10-20 | 10-20 |
| LFP | 1-2 | 0-1 | 0-1 | 0-1 | 5-20 | 10-30 | 5-15 |

Achieving high recovery yields for cobalt is therefore not as crucial as it used to be, at least when considering a feed comprising low-cobalt Li-ion batteries mainly. In view of this, a smelter process wherein cobalt is oxidized, and thus reports to the slag without being recovered, has become economically viable.

While a dedicated smelting process could be considered, it has now been found that a relatively standard copper smelting process is particularly well suited for treating low-cobalt Li-ion batteries. The batteries can be added in addition to the normal copper-bearing feed.

It has in particular been found that such cobalt-depleted Li-ion batteries can be processed on a copper smelter by:
 feeding a useful charge and slag formers to the smelter;
 adding heating and reducing agents;
whereby at least part of the heating and/or reducing agents is replaced by Li-ion batteries containing one or more of metallic Fe, metallic Al, and carbon.

In Li-ion rechargeable batteries, the foil supporting the anode is normally made of metallic Cu, while the foil supporting the cathode is made of metallic Al. Carbon is the typical anode active material; the cathode active material contains one or more of Ni, Mn, Co, and Fe. The casing of the batteries normally contains metallic Al, Fe and/or plastics.

Thanks to their particular composition, rechargeable Li-ion batteries used as an additional feed on top of the standard feed on a Cu smelter can increase the production rate of Cu blister significantly, while considerably lowering the need for fuel. It is here assumed that the fuel needs are compensated by the metallic aluminum, carbon and the plastics present in the battery feed.

The process should preferably remain within commonly accepted boundaries by adjusting the slag formers, and $SiO_2$ in particular, to comply with $0.5 < SiO_2/Fe < 2.5$ and with $Al_2O_3 < 10\%$.

For environmental reasons, it is advisable to aim for a slag wherein cobalt is below 0.1%. This can be achieved by limiting the amount of batteries in the useful charge and/or increasing the proportion of low-cobalt batteries. In any case, it is preferred to feed a major part of low-cobalt batteries. By "low-cobalt" is meant that batteries containing 3% of cobalt or less. By "major part" is meant more than 50% of the total of the batteries present in the useful charge (i.e. excluding flux).

The furnace should be equipped with a feeding system capable of handling relatively large aggregates or lumps having a dimension of at least 1 cm. Also, adequate gas cleaning equipment has to be provided, as Li-ion batteries contain large amounts of halogens, and of fluorine in particular. Such provisions are known and relatively common in copper smelters.

EXAMPLE 1: REFERENCE CHARGE WITHOUT BATTERIES

A typical charge for the smelter is shown in Table 2 below.

TABLE 2

Reference charge of Cu smelter (wt. %)

| Feed rate (t/h) | Li | S | Ni | Mn | Co | Fe | Cu | Al | $Al_2O_3$ | $SiO_2$ |
|---|---|---|---|---|---|---|---|---|---|---|
| 100 (Reference) | — | 18 | 0.6 | — | — | 20 | 25 | — | 1 | 15 |
| 23.2 (Flux) | — | — | — | — | — | — | — | — | — | 100 |

The balance of the reference charge (20%) is moisture. A $SiO_2$/Fe ratio 2.2 is maintained by addition of silica (23.2 ton/h), while $Al_2O_3$ is kept below 6% in the slag. At a feed rate of 100 ton/h, 18% of this feed is converted to Cu blister, 60% to slag, with the gases (mainly $SO_2$) closing the material balance.

The fuel consumption amounts to 3000 l/h, together with 18000 $Nm^3$/h oxygen.

EXAMPLE 2: REFERENCE CHARGE INCLUDING LFP BATTERIES

A charge including LFP batteries and additional flux is shown reported in Table 3 below.

TABLE 3

Reference charge including LFP batteries and additional flux (wt. %)

| Feed rate (t/h) | Li | S | Ni | Mn | Co | Fe | Cu | Al | $Al_2O_3$ | $SiO_2$ |
|---|---|---|---|---|---|---|---|---|---|---|
| 100 (Reference) | — | 18 | 0.6 | — | — | 20 | 25 | — | 1 | 15 |
| 17.6 (Batteries) | 1 | — | — | — | — | 15 | 25 | 10 | — | — |
| 29.0 (Flux) | — | — | — | — | — | — | — | — | — | 100 |

A $SiO_2$/Fe ratio of 2.2 is maintained by adding of 5.8 t/h of $SiO_2$, with respect to the reference case. $Al_2O_3$ is kept below 6% in the slag by limiting the amount of added LFP batteries to 17.6 t/h. This corresponds to a yearly capacity of about 60000 tons of batteries, which is appreciable in view of the quantities of spent batteries of this type presently available on the market.

Using spent batteries as a feed on the Cu smelter, the production rate of Cu blister is thus increased with more than 20%, while hazardous waste is being recycled. Of course, this is dependent upon the relative amounts of Cu present in the reference smelter charge and in the spent batteries.

Due to the high calorific value of the LFP battery feed and to the battery-related Cu being present as metal instead of as oxidized species, the fuel consumption can be decreased from 3000 l/h to 2000 l/h, while the oxygen consumptions rises from 18000 $Nm^3$/h to 20000 $Nm^3$/h to maintain the furnace heat balance. This is a reduction of more than 30% of the energy consumption from fossil sources.

The invention claimed is:

1. A process for the recovery of enthalpy and metals from Li-ion batteries, comprising:
    feeding a charge and slag formers to a copper smelter, wherein the charge comprises a copper-bearing feed; and
    adding heating and reducing agents;
    wherein at least part of the heating and/or reducing agents is replaced by Li-ion batteries containing one or more of metallic Fe, metallic Al, or carbon.

2. The process according to claim 1, wherein the slag formers comprise $SiO_2$ in an amount sufficient to comply with 0.5<$SiO_2$/Fe<2.5 and with $Al_2O_3$<10 wt. % in the formed slag.

3. The process according to claim 1, wherein more than 50% of the Li-ion batteries contain 3 wt. % of Co or less.

4. The process according to claim 2, further comprising adjusting the amount of Li-ion batteries fed to the copper smelter in order to obtain an amount of Co in the formed slag of less than 0.1 wt. %, wherein more than 50% of the Li-ion batteries contain 3 wt. % of Co or less.

* * * * *